(12) United States Patent
Buch et al.

(10) Patent No.: US 8,490,160 B2
(45) Date of Patent: *Jul. 16, 2013

(54) OPEN FEDERATION SECURITY TECHNIQUES WITH RATE LIMITS

(75) Inventors: Jeremy T. Buch, Boulder, CO (US);
Michael Trommsdorff, Zurich (CH);
James Undery, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 941 days.

This patent is subject to a terminal disclaimer.

(21) Appl. No.: 11/906,850

(22) Filed: Oct. 4, 2007

(65) Prior Publication Data
US 2009/0092050 A1 Apr. 9, 2009

(51) Int. Cl.
*G06F 7/04* (2006.01)

(52) U.S. Cl.
USPC .................................. 726/4; 726/22

(58) Field of Classification Search
USPC ............................................................ 726/4
See application file for complete search history.

(56) References Cited

U.S. PATENT DOCUMENTS

| | | | |
|---|---|---|---|
| 6,304,892 B1 | 10/2001 | Bhoj et al. | |
| 6,717,982 B1 | 4/2004 | Ishida et al. | |
| 6,862,628 B2 | 3/2005 | Moore et al. | |
| 6,883,033 B2 | 4/2005 | Maruyama et al. | |
| 7,035,639 B2 | 4/2006 | Obata et al. | |
| 7,194,547 B2 | 3/2007 | Moreh et al. | |
| 7,441,429 B1 | 10/2008 | Nucci et al. | |
| 2003/0133464 A1 | 7/2003 | Marejka et al. | |
| 2003/0167342 A1 | 9/2003 | Munger et al. | |
| 2004/0128542 A1 | 7/2004 | Blakley et al. | |
| 2004/0205188 A1* | 10/2004 | Ahlard et al. | 709/224 |
| 2004/0208146 A1 | 10/2004 | Klein et al. | |
| 2005/0021649 A1 | 1/2005 | Goodman et al. | |
| 2005/0022014 A1* | 1/2005 | Shipman | 713/201 |
| 2005/0044197 A1* | 2/2005 | Lai | 709/223 |
| 2005/0060337 A1 | 3/2005 | Chou et al. | |
| 2005/0183137 A1 | 8/2005 | Jooste | |
| 2005/0188212 A1 | 8/2005 | Laferriere et al. | |
| 2005/0188423 A1* | 8/2005 | Motsinger et al. | 726/22 |
| 2005/0265327 A1* | 12/2005 | Buch et al. | 370/389 |
| 2006/0021018 A1 | 1/2006 | Hinton et al. | |
| 2006/0062209 A1 | 3/2006 | Riley | |
| 2006/0123472 A1 | 6/2006 | Schmidt et al. | |

(Continued)

OTHER PUBLICATIONS

Mahler, Eva, "Federated Identity Management", http://www.idealliance.org/proceedings/xml05/ship/177/177-maler-fed-id.HTML, Retrieved Apr. 11, 2007.

(Continued)

*Primary Examiner* — Cordelia Zecher (57) ABSTRACT

Open federation security techniques with rate limits are described. An apparatus may include a network interface operative to communicate messages, and a secure open federation (SOF) module operative to manage a message rate between multiple federated networks. The SOF module may comprise a peer authentication module operative to determine whether a peer making the message is an untrusted peer. The SOF module may comprise a peer rate tracking module operative to retrieve a message rate value and a message rate limit value associated with the untrusted peer, and compare the message rate value with the message rate limit value to form a threat status indicator value. The SOF module may comprise a peer authorization module operative to authorize communication of the message based on the threat status indicator value. Other embodiments are described and claimed.

19 Claims, 5 Drawing Sheets

U.S. PATENT DOCUMENTS

| | | |
|---|---|---|
| 2006/0136990 A1 | 6/2006 | Hinton et al. |
| 2006/0182029 A1* | 8/2006 | Kealy et al. .................. 370/230 |
| 2006/0236382 A1 | 10/2006 | Hinton et al. |
| 2006/0285493 A1 | 12/2006 | Manuja et al. |
| 2007/0005804 A1 | 1/2007 | Rideout |
| 2009/0092050 A1 | 4/2009 | Buch et al. |

OTHER PUBLICATIONS

Norlin et al., "Ping ID—Federated Identity Management", Date: 2002, pp. 1-15.

Zugic, Goran, "ebXML and Federated Enterprise Reference Architecture (EFERA)", Date: Jul. 21, 2003,, pp. 1-7.

* cited by examiner

OPEN FEDERATION SECURITY TECHNIQUES WITH RATE LIMITS

CROSS REFERENCE TO RELATED APPLICATION

This application is related to commonly owned U.S. patent application Ser. No. 11/821,605 titled "Open Enhanced Federation Security Techniques," and filed on Jun. 25, 2007, the entirety of which is hereby incorporated by reference.

BACKGROUND

Instant Messaging (IM) and presence federation allows users from different enterprises who are federating with each other to share presence information and exchange instant messages. It may be desirable to establish the federated link as automatically and seamlessly as possible to extend the productivity benefits of the IM and presence features beyond the limits of the enterprise network. The method for automatically allowing federation between enterprises without specific configuration is called Open Enhanced Federation (OEF), and is accomplished by using Domain Name System (DNS) records to locate a peer and cryptographic certificates to prove that a peer's identity matches expected values for the enterprise they are claiming to represent. This could be accomplished in a secure manner. One of the risks for an enterprise when federating, however, is having increased security concerns, such as an unknown federated party performing a directory attack on the local enterprise directory. An example of a possible directory attack is to send messages not displayed to end users to certain user names and attempt to determine if the user names are valid or not in the enterprise. This may be based on differences in the responses. Such an attack could be used to target valid users with unsolicited Voice Over Internet Protocol (VoIP) calls, electronic mails (emails) and instant messages.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments may be generally directed to a communications system. Some embodiments may be particularly directed to a communications system comprising multiple federated enterprise networks to provide various real-time communications services such as IM. Each federated enterprise network may include an access edge server to control access to the federated enterprise network. The access edge server may be arranged to facilitate open communications between the federated enterprise networks while potentially reducing security threats from unknown or untrusted federated users or devices.

In one embodiment, for example, an apparatus such as an access edge server for a federated enterprise network may include a network interface operative to establish instant messaging connections, and communicate messages over the instant messaging connections. The access edge server may further include a secure open federation (SOF) module communicatively coupled to the network interface. The SOF module may be operative to manage a message rate between multiple federated networks. In one embodiment, for example, the SOF module may comprise a peer rate tracking module operative to retrieve a message rate value and a message rate limit value associated with the peer. The message rate value may represent a number of messages communicated by an untrusted peer within a certain time period. The message rate limit value may represent a limit on the number of messages communicated by an untrusted peer within a certain time period. The message rate limit value may be automatically or selectively adjusted based on one or more rate adjustment metrics. The peer rate tracking module may compare the message rate value with the message rate limit value to form a threat status indicator value. The SOF module may also comprise a peer authorization module operative to authorize messages based on the threat status indicator value. In this manner, a federated enterprise network may automatically and seamlessly extend the productivity benefits of the IM and presence features beyond the limits of the federated enterprise network, while improving measures against possible security threats. Other embodiments are described and claimed.

DETAILED DESCRIPTION

Various embodiments may comprise one or more elements. An element may comprise any feature, characteristic, structure or operation described in connection with an embodiment. Examples of elements may include hardware elements, software elements, physical elements, or any combination thereof. Although an embodiment may be described with a limited number of elements in a certain arrangement by way of example, the embodiment may include more or less elements in alternate arrangements as desired for a given implementation. It is worthy to note that any references to "one embodiment" or "an embodiment" or similar language are not necessarily referring to the same embodiment.

Various embodiments may be directed to a communications system comprising multiple federated enterprise networks to provide various real-time communications services such as IM. Each federated enterprise network may include an access edge server to control access to the federated enterprise network. The access edge server may be arranged to facilitate open communications between the federated enterprise networks while potentially reducing security threats from unknown or untrusted federated users or devices. This may be accomplished, for example, by implementing secure open federation (OEF) module as part of the access edge server. The SOF module may be arranged to monitor and limit a message rate for messages sent to internal clients within its federated enterprise network by external federated entities. Limiting a message rate for messages sent to internal clients from an external federated entity permits legitimate but unknown federated entities to access services offered by a federated enterprise network, while limiting or reducing the amount of exposure the federated enterprise network has to security threats from malicious federated entities. In this manner, a federated enterprise network may automatically and seamlessly extend the productivity benefits of the IM and presence features beyond the limits of the federated enterprise network, while improving measures against possible security threats.

Figure 1:
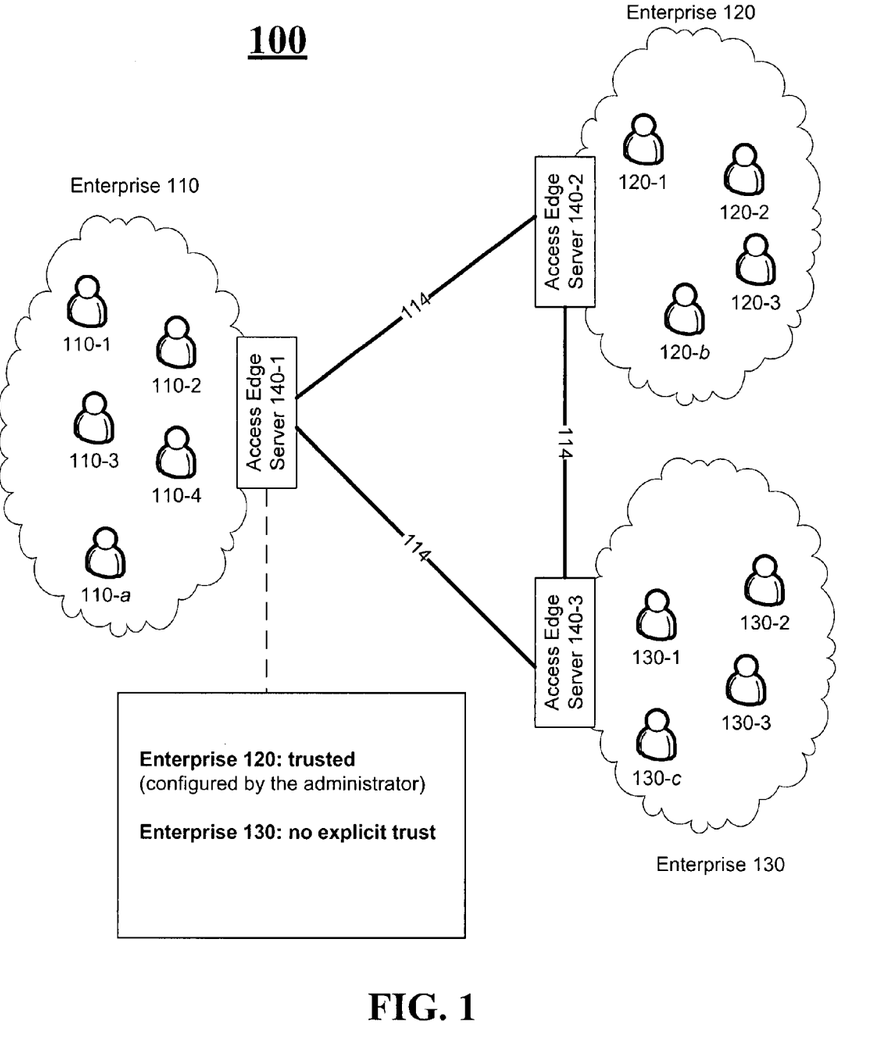
FIG. 1 illustrates one embodiment of a communications system.

FIG. 1 illustrates a block diagram of a communications system 100. In various embodiments, the communications system 100 may be implemented as a wireless communication system, a wired communication system, or a combination of both. When implemented as a wireless communication system, communications system 100 may include components and interfaces suitable for communicating over wireless communications media, such as one or more antennas, transmitters, receivers, transceivers, amplifiers, filters, control logic, and so forth. An example of the communications media may include a wireless shared media implemented using portions of a wireless spectrum, such as the radio-frequency (RF) spectrum and so forth. When implemented as a wired communications system, communications system 100 may include components and interfaces suitable for communicating over wired communications media, such as input/output (I/O) adapters, physical connectors to connect the I/O adapter with a corresponding wired communications medium, network interfaces, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

As shown in the illustrated embodiment of FIG. 1, the communications system 100 may include multiple federated enterprise networks 110, 120 and 130. The federated enterprise networks 110, 120 and 130 may each comprise respective operators and operator devices 110-1-a, 120-1-b and 130-1-c. The operator or user devices may include any number of electronic and network-accessible components, devices or systems, including computers, personal computers, laptop computers, handheld computers, cellular telephones, Voice over Internet Protocol (VoIP) telephones, servers, VoIP servers, IM servers, presence information servers, unified messaging servers, unified communications servers, workstations, network appliances, consumer electronics, televisions and so forth. The federated enterprise networks 110 may each comprise one or more access edge servers 140-1-m, all connected by various wireless or wired communications media 114. Although the communications system 100 is shown in FIG. 1 with a limited number of networks and network equipment in a given topology, it may be appreciated that the communications system 100 may comprise more or less networks and network equipment in a different topology and still fall within the scope of the embodiments.

In various embodiments, federated enterprise networks 110, 120 and 130 may each comprise a service-oriented architecture (SOA) network having users that share a federated identity. Federated identity, or the federation of identity, describes the technologies, standards and use-cases which serve to enable the portability of identity information across otherwise autonomous security domains. Identity federation enables users of one domain to securely access data or systems of another domain seamlessly, and without the need for completely redundant user administration. Federation is enabled through the use of open industry standards and/or openly published specifications, such that multiple parties can achieve interoperability for common use cases. Typical use-cases involve things such as cross-domain, web-based single sign-on, cross-domain user account provisioning, cross-domain entitlement management and cross-domain user attribute exchange. Federated identity techniques may facilitate user-to-user, user-to-application or application-to-application use-case scenarios at both the browser tier and the web services or SOA tier. It can involve high-trust, high-security scenarios as well as low-trust, low security scenarios. It can also involve user-centric use-cases, as well as enterprise-centric use-cases.

The federated enterprise networks 110 may each comprise one or more access edge servers 140-1-m, all connected by various wireless or wired communications media 114. The access edge servers 140-1-m may manage access to the respective federated enterprise networks 110, 120 and 130. More particularly, the access edge servers 140-1-m may manage security operations on behalf of their respective networks to allow users of one domain to securely access data or systems of another domain seamlessly. For example, assume an operator 120-1 of the network 120 desires to communicate with an operator 110-1 of the network 110. To accomplish this, the operator 120-1 traverses the access edge server 140-1 while adhering to the open federation specifications, standards or policies established for the networks 110, 120 for the various defined use-scenarios.

In one embodiment, for example, one or more of the access edge servers 140-1-m may be implemented as a MICROSOFT® OFFICE LIVE COMMUNICATIONS SERVER, made by MICROSOFT CORPORATION, Redmond, Wash. The MICROSOFT OFFICE LIVE COMMUNICATIONS SERVER comprises an enterprise real-time communications server. The MICROSOFT OFFICE LIVE COMMUNICATIONS SERVER is designed to manage and facilitate communications between various client applications implemented by the operators 110-1-a, 120-1-b and 130-1-c. For example, the MICROSOFT OFFICE LIVE COMMUNICATIONS SERVER may be arranged to provide IM and collaboration functionality between client applications such as MICROSOFT WINDOWS® MESSENGER or MICROSOFT OFFICE COMMUNICATOR CLIENT.

In various embodiments, the access edge servers 140-1-m may be arranged to implement various federation policies for the management of IM and collaboration functionality or operations between the federated enterprise networks 110, 120 and 130. The federated enterprise networks 110, 120 and 130 may each provide various IM and collaboration services to clients within their own domains. Such IM and collaboration functionality or operations may include presence information, application sharing, file transfer and voice and video communication. Some or all of these features are often not possible even within a single network using public IM clients, however, due to the effects of negotiating the corporate firewall and Network Address Translation (NAT) services. By implementing IM and presence federation through the federation policies, the access edge servers 140-1-m may interoperate with other corporate IM networks to allow federated users from cross-domains to share presence information and exchange instant messages.

The particular federation policy implemented by the access edge servers 140-1-m could be designed to establish the federated link as automatically and seamlessly as possible to extend the productivity benefits of the IM and presence features beyond the limits of a single enterprise network. The federated links, however, could be established in a secure manner. There are a number of security threats to federated networks. For example, the federated enterprise networks 110, 120 and 130 may be subject to Denial of Service (DoS) attacks at the Session Initiation Protocol (SIP) level, the enumeration of enterprise users, messaging spam comprising unsolicited and likely automated instant messages targeting users of IM services, and so forth.

In various embodiments, the access edge servers 140-1-*m* may be arranged to handle these and other security threats by implementing various rate limitation features for public users, such as limiting traffic to a certain number of messages per second (e.g., 20 messages/second). In the illustrated embodiment shown in FIG. 1, each federated enterprise network 110, 120 and 130 may include respective access edge servers 140-1, 140-2 and 140-3 to control access to its federated enterprise network. The access edge servers 140-1-*m* may be arranged to facilitate open communications between the federated enterprise networks while potentially reducing security threats from unknown or untrusted federated users or devices. In some embodiments, for example, federated enterprises that are connecting to a given federated enterprise and that are not explicitly trusted by the local administrator (e.g., they are "untrusted" or "unknown") are only able to send messages to the federated enterprise at a limited rate. Once the given limit rate is reached the throughput of messages from the untrusted federated partner is limited by the respective access edge server 140-1-*m*. The rate limitation may be dynamically adjusted based on certain rate limitation metrics monitored and tracked by the access edge servers 140-1-*m*. In some case, the rate limitation may be manually remove by an administrator, or automatically by rate limit logic, once a federated enterprise moves from being an untrusted or unknown federated enterprise to a trusted or known federated enterprise. In this manner, a legitimate federated enterprise has the ability to establish a federated link with a given federated enterprise and vice-versa. Furthermore, a malicious federated enterprise intending to perform a security attack (e.g., a DoS attack) would only be capable of performing a limited attack due to the message rate limitations. The communications system 100 in general, and the access edge servers 140-1-*m* in particular, may be described in more detail with reference to FIGS. 2-5.

Figure 2:
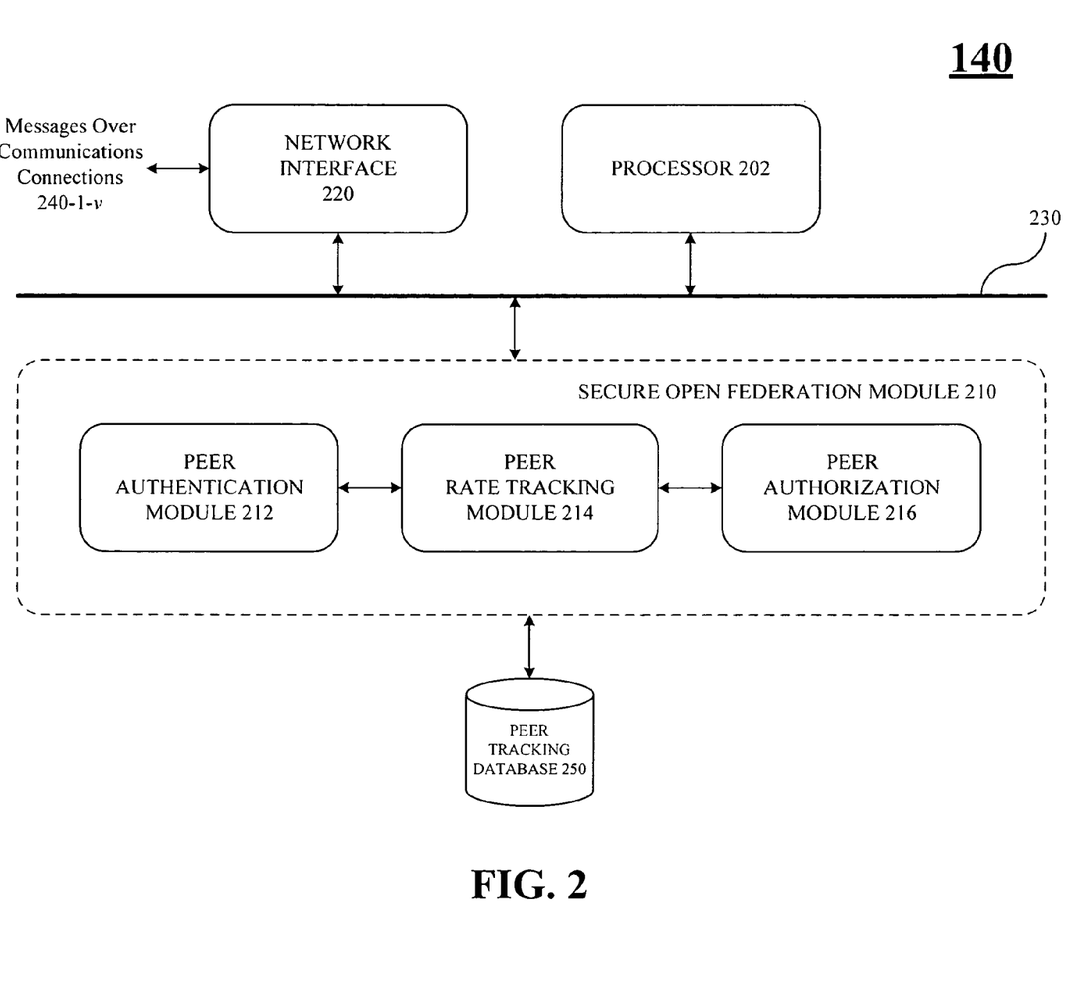
FIG. 2 illustrates one embodiment of an access edge server.

FIG. 2 illustrates one embodiment of an access edge server 140. The access edge server 140 may be representative of, for example, one or more of the access edge servers 140-1, 140-2 and 140-3. As shown in FIG. 2, the access edge server 140 for a federated enterprise network 110, 120 or 130 may include a network interface 220 operative to communicate multiple messages over one or more communications connections 240-1-*v*. The messages may represent messages generated by any type of messaging application, such as a short message service (SMS) application, a SMS cell broadcast (SMS-CB) application, a multimedia message service (MMS) application, an electronic mail (email) application, an instant messaging (IM) application, a text message application, a voice message application, a video message application, a group message application, a synchronous conferencing application, an asynchronous conferencing application, and so forth. The communications connections 240-1-*v* may represent any logical or physical connections between enterprises or peers to communication information, including control information and media information. Examples of communications connections 240-1-*v* may include IM connections, VoIP connections, presence information connections, email connections, chat connections, pager connections, and so forth. In one embodiment, for example, the network interface 220 may be operative to communicate multiple instant messages over one or more instant messaging connections 240-1-*v*. Although some embodiments may describe one type of message comprising instant messaging messages by way of example and not limitation, it may be appreciated that other message types may also be communicated and still fall within the scope of the embodiments.

The access edge server 140 may further include a secure open federation (SOF) module 210 communicatively coupled to the network interface 220. The SOF module 210 may comprise, for example, hardware and/or software such as rate limitation logic (e.g., instructions, data, and/or code) to be executed by a logic device (e.g., a processor). The rate limitation logic may be stored internally or externally to the logic device on one or more types of computer-readable storage media. In various implementations, the SOF module 210 may communicate with a rate limitation rules database arranged to store rules and parameters for controlling the performance of rate limitation operations for different design constraints and performance limitations.

In various embodiments, the SOF module 210 may be operative to manage various message communications transmitted and received via the communications connections 240-1-*v* between multiple federated clients 110-1-*a*, 120-1-*b* and 130-1-*c* and multiple federated networks 110, 120 and 130. More particularly, the SOF module 210 may be used to implement various security techniques to reduce security threats between federated enterprise networks 110, 120 and 130. For example, the SOF module 210 may operate to limit the number of messages communicated to a given federated enterprise network from another federated enterprise network or individual clients within another federated enterprise network. In some cases, the SOF module 210 may collectively treat an entire federated enterprise network 110, 120 or 130 as a peer or peer domain, including all the individual entities within a given federated enterprise network, such as respective operators 110-1-*a*, 120-1-*b* or 130-1-*c*. In this use scenario, for example, all of the operators 110-1-*a* will be treated as a single trusted or untrusted entity, all of the operators 120-1-*b* will be treated as a single trusted or untrusted entity, and all of the operators 130-1-*c* will be treated as a single trusted or untrusted entity. In other cases, however, the SOF module 210 may individually treat each operator from a given federated enterprise network as an individual peer (e.g., 110-1 as a first peer, 110-2 as a second peer, and so forth). The embodiments are not limited in this context.

In one embodiment, for example, the SOF module 210 may comprise a peer authentication module 212. The peer authentication module 212 may be operative to determine whether a peer sending a message is a trusted peer or untrusted peer. A trusted peer may comprise a peer that is known to the peer authentication module 212. The peer authentication module 212 may retrieve a set of privileges associated with the trusted peer, and process messages from the trusted peer in accordance with the trusted privilege rules. An untrusted peer may comprise a peer that is unknown to the peer authentication module 212. The peer authentication module 212 may retrieve a set of privileges associated with untrusted peers, and process messages from the untrusted peer in accordance with the untrusted privilege rules. In many cases, the trusted privilege rules provide greater access to network services than the untrusted privilege rules. In some cases, the peer authentication module 212 may allow an untrusted peer to become a trusted peer over some period of time based on the behavior of the untrusted peer. For example, the peer authentication module may be operative to determine the untrusted peer is a trusted peer when a threat status indicator value associated with the untrusted peer comprises a value greater than zero after expiration of a defined time period, as discussed in more detail below.

For example, assume the federated enterprise networks 110, 120 are configured to allow for open federation. This means that any operator 110-1-*a*, 120-1-*b* are able to communicate with any other operators that are part of a federated enterprise network that allows open federation as well. Further assume the peer authentication module 212 for the access edge server 140-1 of the federated enterprise network 110 has the federated enterprise network 120 marked, annotated or listed as a trusted peer network. In this case, when an operator 120-1-*b* from the federated enterprise network 120 requests access to network services provided by the federated enterprise network 110, such as sending an IM message over an IM connection 240-1-*v*, the peer authentication module 212 may engage in authentication operations to verify the identify of the operator 120-1-*b* from the network 120. Once authenticated, the peer rate tracking module 212 may determine that the operator 120-1-*b* is from the trusted peer network 120. The SOF module 210 may then establish the IM connection 240-1-*v* with the appropriate operator 110-1-*a* from the federated enterprise network 110, and allow unlimited message communication between federated enterprise networks 110, 120.

Continuing with this example, assume the federated enterprise network 130 is also configured to allow for open federation. Further assume the peer authentication module 212 for the access edge server 140-1 of the federated enterprise network 110 has the federated enterprise network 130 marked, annotated or listed as an untrusted peer network. In this case, when an operator 130-1-*c* from the federated enterprise network 130 requests access to network services provided by the federated enterprise network 110, such as communicating an IM message over an IM connection 240-1-*v*, the peer authentication module 212 may engage in authentication operations to verify the identify of the operator 130-1-*c* from the network 130. Once authenticated, the peer rate tracking module 212 may determine that the operator 120-1-*c* is from the untrusted peer network 130. The untrusted peer network 130, however, may be a potentially legitimate federated partner, and therefore the SOF module 210 may not want to simply reject all messages from the untrusted peer network 130. On the other hand, the SOF module 210 may not automatically accept the untrusted peer network 130 with the same level of privileges granted to a trusted peer network such as the trusted peer network 120, since one or more operators 130-1-*c* of the untrusted peer network 130 may be attempting to compromise security for the federated enterprise network 110. For example, an operator 130-1-*c* may be attempting to mount a DoS attack or directory attack. Consequently, prior to accepting the message for the communications connection 240-1-*v*, the peer rate tracking module 212 may need to pass the message to other elements of SOF module 210 for further security processing.

In one embodiment, for example, the SOF module 210 may further comprise a peer rate tracking module 214. The peer rate tracking module 214 may be operative to retrieve a message rate value and a message rate limit value associated with the untrusted peer. The peer rate tracking module 214 may compare the message rate value with the message rate limit value to form a threat status indicator value. The threat status indicator value may be used to authorize communication of the message based on the comparison. For example, the threat status indicator value may be used to determine whether the SOF module 210 could accept or reject a message communicated by a communications connection 240-1-*v* from an untrusted peer.

The peer rate tracking module 214 may be operative to retrieve a message rate value and a message rate limit value associated with an untrusted peer. The message rate value may represent a number of messages communicated by an untrusted peer within a certain time period. The message rate limit value may represent a limit on the number of messages communicated by an untrusted peer within a certain time period. The message rate limit value may be stored as a DWORD such as MaximumOEFmessages, for example, with a default limit threshold value (e.g., 20 messages/second) and potentially a disable value (e.g., zero). The defined time period for the message rate limit value may be stored as a DWORD such as OEFMessageTrackingTTL, for example, with a default time period threshold value. For example, the default time period threshold value may comprise a value of 0x93A0, which represents 604800 seconds or one week.

The peer rate tracking module 214 may count a number of messages sent from an external peer to one or more uniform resource identifiers (URIs) of internal clients to form the message rate value. The peer rate tracking module 214 may associate the message rate value with a given untrusted peer, and periodically or continuously update the message rate value for each new message received from the associated peer.

The peer rate tracking module 214 may compare the message rate value with the message rate limit value to form a threat status indicator value. The threat status indicator value may represent a level of threat for a given unknown or untrusted peer. For example, assume the message rate value for an untrusted peer 130-1 was 18 messages per second, and the message rate limit value for the untrusted peer 130-1 was 20 messages per second. In this case, the threat status indicator value would be the value of two (2). Under this formulation, the higher the threat status indicator the less the SOF module 210 would consider the untrusted peer 130-1 a threat, and the lower the threat status indicator the more the SOF module 210 would consider the untrusted peer 130-1 a threat. For example, if over time the untrusted peer 130-1 reached 20 messages per second, then the threat status indicator value would be a value of zero (0). Once this message rate limit has been hit, the SOF module 210 may consider the untrusted peer 130-1 a serious threat, and begin monitoring the untrusted peer 130-1 more closely to determine whether the untrusted peer 130-1 is engaging in any illicit or unauthorized behavior. The peer rate tracking module 214 may maintain and update a threat status indicator value for each untrusted peer, and output or store the threat status indicator value for use by the peer authorization module 216 to determine whether the SOF module 210 could accept or reject a message from an untrusted peer.

At some point, the SOF module 210 will consider an untrusted peer an increased security threat, and begin monitoring the untrusted peer more closely to determine whether the untrusted peer is engaging in any illegal or unauthorized behavior. For example, the peer rate tracking module 214 may associate a threat watch indicator with the untrusted peer when a message rate value is equal to or greater than a message rate limit value. The SOF module 210 may maintain a list of untrusted peer having threat watch indicators, and perform enhanced security analysis and enable stronger security measures based on the behavior of the untrusted peers.

It is worthy to note that although the threat status indicator value may be assigned a specific value for purposes of granularity, it may be appreciated that other techniques may be used to indicate that the limit threshold for a peer has been reached. For example, a simple binary flag may be set to indicate TRUE or FALSE conditions for the SOF module 210.

Rather than blocking all new messages once the defined message rate limit for an enterprise has been hit, the administrator may also use the limit threshold as a potential indicator that the peer has a legitimate relationship to the enterprise. In this case, the administrator may evaluate whether the peer could be configured as trusted by the administrator.

In various embodiments, the peer rate tracking module 214 may maintain the message rate value and the message rate limit value using a peer tracking database 250. In one embodiment, the peer tracking database 250 may be operative to store the message rate value and the message rate limit value. The message rate value and message rate limit value may be stored as counters.

In some cases, the peer rate tracking module 214 may reset the message rate value counter periodically without necessarily assigning the peer a trusted status, which is a natural extension without asserting trust. The peer rate tracking module 214 may also send some interactive feedback via a user interface or graphic user interface (GUI) to a user of interest to let them know when "new" untrusted peers show up, or tracking this list for manual administrative changes.

In one embodiment, for example, the SOF module 210 may also comprise a peer authorization module 216. The peer authorization module 216 may be operative to authorize communication of the message based on the threat status indicator value. For example, assume the peer rate tracking module 214 is arranged to derive the threat status indicator value by subtracting the message rate value from the message rate limit value. In this case, the peer authorization module 216 may retrieve the threat status indicator value from the peer tracking database 250 to determine whether to authorize communication of the message. The peer authorization module 216 may reject the message when the threat status indicator value comprises a value equal to zero (0), and accept the message when the threat status indicator value comprises a value greater than zero (0). Stated another way, the peer authorization module 216 may reject the message when the message rate value is equal to or greater than a message rate limit value for the untrusted peer, and accept the message when a message rate value is less than a message rate limit value for the untrusted peer.

Once the peer authorization module 216 determines that a message or group of messages have exceeded the message rate limit and represent a security threat, the peer authorization module 216 may then take various mitigation operations for incoming messages from the untrusted peer 130-1. For example, the message mitigation operations may include routing the message to a different server or network element, deleting the message, delivering the message, placing the message in a quarantine, performing security or virus scanning operations for the message, performing statistical or quantitative tracking and analysis of the message, delaying the message, rejecting the message, challenging the message, and so forth. The particular message mitigation operations may vary as desired for a given implementation.

Operations for the communications system 100 may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more elements of the communications system 100 or alternative elements as desired for a given set of design and performance constraints.

Figure 3:
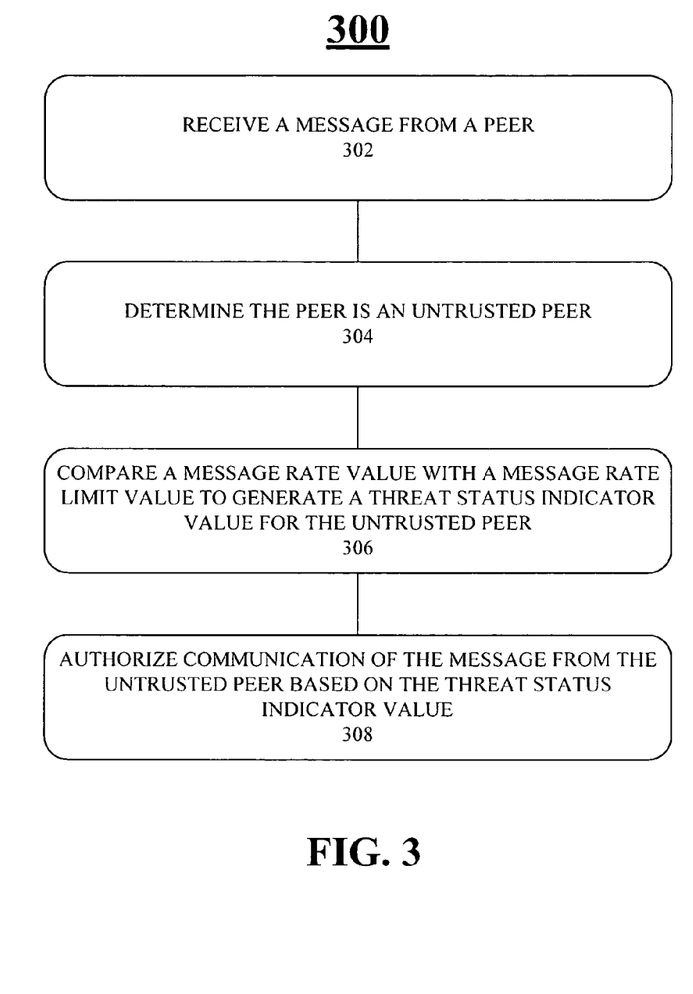
FIG. 3 illustrates one embodiment of a logic flow.

FIG. 3 illustrates a logic flow 300. The logic flow 300 may be performed by various systems and/or devices and may be implemented as hardware, software, and/or any combination thereof, as desired for a given set of design parameters or performance constraints. For example, the logic flow 200 may be implemented by a logic device (e.g., processor) and/or logic (e.g., instructions, data, and/or code) to be executed by a logic device. For purposes of illustration, and not limitation, the logic flow 300 is described with reference to FIGS. 1 and 2.

As shown in FIG. 3, the logic flow 300 may receive a message for a connection from a peer at block 302. The logic flow 300 may determine the peer is an untrusted peer at block 304. The logic flow 300 may compare a message rate value with a message rate limit value to generate a threat status indicator value for the untrusted peer at block 306. The logic flow 300 may authorize communication of the message from the untrusted peer based on the threat status indicator value at block 308. The embodiments are not limited in this context.

In one embodiment, the logic flow 300 may receive a message for a connection from a peer at block 302. For example, assume the access edge server 140-1 for the federated enterprise network 110 receives a message for a connection 240-1 from the federated enterprise network 130 on behalf of peer 130-1. The message may be passed to the SOF module 210 for security processing.

In one embodiment, the logic flow 300 may determine the peer is an untrusted peer at block 304. From the previous example, assume the SOF module 210 has the federated enterprise network 130 listed as an untrusted peer network in the peer tracking database 250. The peer authentication module 212 may retrieve a peer status indicator associated with the federated enterprise network 130 in general, or the peer 130-1 in particular, and use the peer status indicator to determine that the federated enterprise network 130 is considered an untrusted peer and so are messages from all its clients.

In one embodiment, the logic flow 300 may compare a message rate value with a message rate limit value to generate a threat status indicator value for the untrusted peer at block 306. For example, the peer rate tracking module 214 may retrieve a message rate value and a message rate limit value associated with the enterprise 130. The peer rate tracking module 214 may compare the message rate value with the message rate limit value to generate a threat status indicator value for the untrusted enterprise 130. The peer rate tracking module 214 may store the threat status indicator value computed for the untrusted enterprise 130 in the peer tracking database 250.

In one embodiment, the logic flow 300 may authorize communication of the message from the untrusted peer based on the threat status indicator value at block 308. For example, the peer authorization module 216 may retrieve the threat status indicator value for the untrusted enterprise 130 from the peer tracking database 250. The peer authorization module 216 may evaluate the threat status indicator value for the untrusted enterprise 130 to determine how to process the message. For example, the peer authorization module 216 may be arranged to reject the message when the threat status indicator value comprises a value equal to zero (0). The peer authorization module 216, however, may accept the message when the threat status indicator value comprises a value greater than zero (0), such as a positive integer.

In various embodiments, a logic device such as the SOF module 210 of a given access edge server 140-1-*m* may be arranged to dynamically adjusting the message rate limit value based on one or more rate adjustment metrics. A particular message rate limit value assigned to an untrusted federated enterprise network, such as federated enterprise network 130, may periodically or continuously vary in accordance with one or more rate adjustment metrics. An element of the SOF module 210, such as the peer rate tracking module 214, may implement one or more of rate adjustment metrics for a given untrusted federated enterprise network, and may automatically or selectively increase or decrease the message rate limit value for the untrusted federated enterprise network based on an evaluation or analysis of the implemented rate adjustment metrics. The rate adjustment metrics may comprise any measured characteristic of the communications connections 240-1-v between the federated enterprise networks 110, 130. Examples of rate adjustment metrics may include without limitation a federation partner type, administrator configuration parameters, message traffic patterns, a size of a user group, message traffic direction, a number of message connections, and so forth. Although a few rate adjustment metrics are given by way of example, it may be appreciated that any rate adjustment metric that allows an access edge server 140-1-m to balance a given level of security with a given level of access may be implemented as desired. The embodiments are not limited in this context.

In one embodiment, the peer rate tracking module 214 may dynamically adjust the message rate limit value in accordance with a rate adjustment metric based on a federation partner type. For example, the peer rate tracking module 214 may determine whether an untrusted peer is a federated enterprise network, a federated hoster, a federated public cloud, and so forth. The peer rate tracking module 214 may then assign different message rate limits to different federated partners. For example, a federated enterprise network may have a greater likelihood of being a legitimate federated partner, and therefore be assigned a correspondingly higher message rate limit. A federated public cloud, however, may have a lower likelihood of being a legitimate federated partner, and therefore be assigned a correspondingly lower message rate limit than the federated enterprise network.

In one embodiment, the peer rate tracking module 214 may dynamically adjust the message rate limit value in accordance with a rate adjustment metric based on administrator configuration parameters. For example, the peer rate tracking module 214 may analyze the administrator configuration parameters for a given federated partner. The peer rate tracking module 214 may then infer a message rate limit appropriate for the federated partner based on the analysis results.

In one embodiment, the peer rate tracking module 214 may dynamically adjust the message rate limit value in accordance with a rate adjustment metric based on message traffic patterns. For example, the peer rate tracking module 214 may monitor a number of errors communicated via the communications connections 240-1-v to a given federated partner, and infer a message rate limit appropriate for the federated partner based on the error rate. Examples of errors may include errors indicating that a requested Uniform Resource Identifier (URI) does not exist, an internal client blocks or rejects certain URIs, and so forth. In some cases, higher error rates may indicate a potential security threat, such as in a directory attack. User enumeration or a directory attack is a process where an attacker uses the SIP protocol to ascertain valid URIs in an enterprise. This can be done for a number of reasons including discovery or verification. Discovery means that an attacker is attempting to create a list of valid URI in an enterprise. This may be done to perform further attacks. Verification is where an attacker has a list of the enterprise URI and wants to verify that they are still valid. Both of these attacks are characterized by the attacker communicating with a larger number of users and in the case of discovery a very large number of users, and correspondingly higher error rates. Consequently, higher error rates may merit lower message rate limits, and vice-versa.

In one embodiment, the peer rate tracking module 214 may dynamically adjust the message rate limit value in accordance with a rate adjustment metric based on a size for a user group. For example, the peer rate tracking module 214 may monitor a number of users involved in a federated communication. The peer rate tracking module 214 may vary the message rate limit depending on whether the messages are communicated between a smaller group of users and a larger group of users. For example, if the federated enterprise network 130 comprises a smaller group of operators and/or operator devices 130-1-c (e.g., 100 users) communicating with a larger group of operators and/or operator devices 110-1-a (e.g., 10000 users), the communications may be suspicious due to the large imbalance between user groups. A user enumeration or directory attack, for example, would typically involve a smaller group sending messages to a larger group. The message rate limit value for the federated enterprise network 130 may be adjusted accordingly.

In one embodiment, the peer rate tracking module 214 may dynamically adjust the message rate limit value in accordance with a rate adjustment metric based on a message traffic direction. For example, the peer rate tracking module 214 may monitor a number of messages involved in a federated communication. The peer rate tracking module 214 may vary the message rate limit depending on whether the number of incoming messages from an untrusted peer are greater than outgoing messages to the untrusted peer. For example, if the federated enterprise network 130 is sending a larger volume of messages from operators and/or operator devices 130-1-c relative to a smaller volume of messages sent from operators and/or operator devices 110-1-a of the federated enterprise network 110, the communications may be suspicious due to the large imbalance between message volumes. A DoS attack, for example, would typically involve a larger volume of incoming messages than outgoing messages. The message rate limit value for the federated enterprise network 130 may be adjusted accordingly.

In one embodiment, the peer rate tracking module 214 may dynamically adjust the message rate limit value in accordance with a rate adjustment metric based on a number of message connections. The peer rate tracking module 214 may monitor the number of unique connections established by, or requested from, an untrusted federated partner. The peer rate tracking module 214 may track a total request number for an untrusted federated partner. The total request number may represent a number of unique URIs contacted by requests made by an untrusted peer within a certain time period.

The total limit number may represent a number of unique URIs contacted by requests allowed for a given untrusted peer within a certain time period. The total limit number may be stored as a DWORD such as MaximumOEFcontacts, for example, with a default limit threshold value (e.g., 1000) and potentially a disable value (e.g., zero). The defined time period for the total limit number may be stored as a DWORD such as OEFContactTrackingTTL, for example, with a default time period threshold value. For example, the default time period threshold value may comprise a value of 0x93A0, which represents 604800 seconds or one week. The peer tracking module 214 may count a number of requests from a peer to a unique URIs to form the total request number. This may include both valid and invalid URIs. The latter URIs may be particularly valuable information since it catches directory attacks involving guessing where the attacker is more likely to be wrong than right when trying URIs. The peer tracking module 214 may associate the total request number with a given untrusted peer, and update the total request number for each new request from the associated peer for a new connection 240-1-v to a unique URI. A higher total request number for a given time period may indicate a potential directory attack. The message rate limit value for the untrusted peer may be adjusted accordingly.

Figure 4:
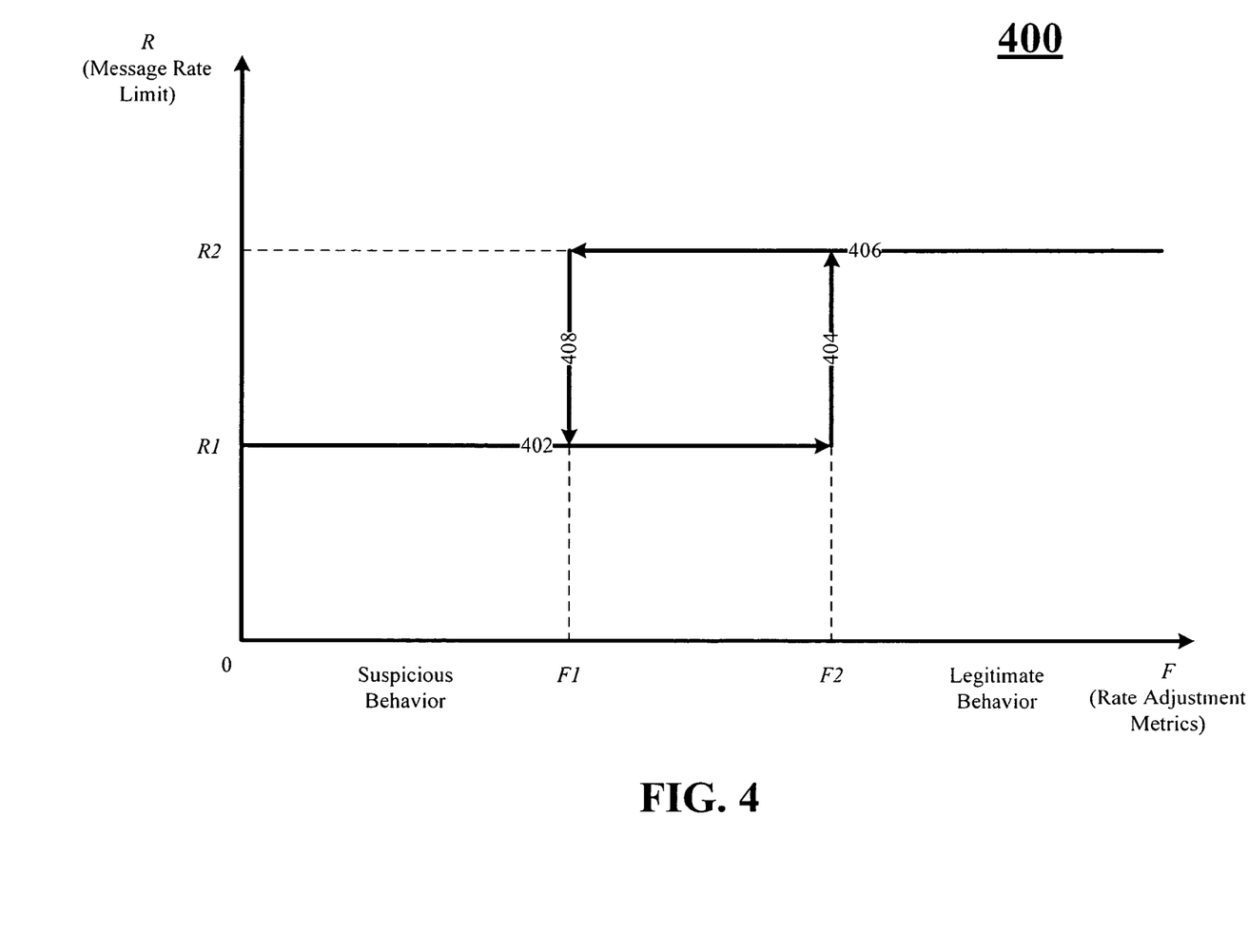
FIG. 4 illustrates one embodiment of a graph.

FIG. 4 illustrates a graph 400 illustrating a relationship between message rate limits and rate adjustment metrics. As shown in FIG. 4, the graph 400 illustrates a message rate limit (R) on the y-axis and rate adjustment metrics (F) on the x-axis. Progressing along the x-axis away from the center of the chart represented by zero (0), as the characteristics of the message traffic communicated over the communications connections 240-1-*v*, move from suspicious behavior to legitimate behavior as measured by implemented rate adjustment metrics F1 and F2, the message rate limit may be raised from R1 to R2, as indicated by arrows 402, 404. Progressing along the x-axis towards the center of the chart represented by zero (0), as the characteristics of the message traffic communicated over the communications connections 240-1-*v* move from legitimate behavior to suspicious behavior as measured by implemented rate adjustment metrics F1 and F2, the message rate limit may be lowered from R2 to R1, as indicated by arrows 406, 408.

Figure 5:
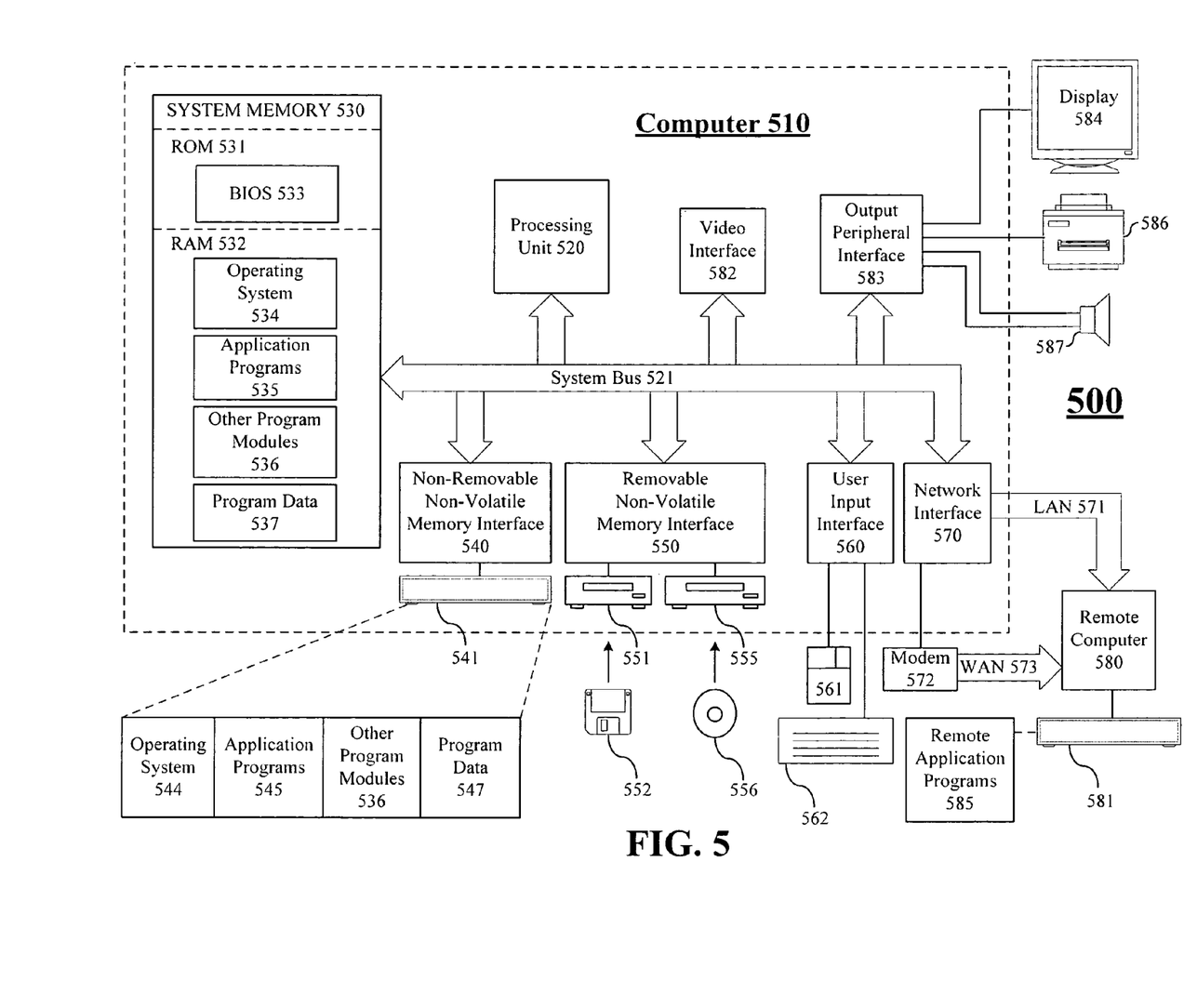
FIG. 5 illustrates one embodiment of a computing system architecture.

FIG. 5 illustrates a block diagram of a computing system architecture 500 suitable for implementing various embodiments, including various elements of the communications system 100, such as the SOF 210 of the access edge servers 140-1-*m*, for example. It may be appreciated that the computing system architecture 500 is only one example of a suitable computing environment and is not intended to suggest any limitation as to the scope of use or functionality of the embodiments. Neither could the computing system architecture 500 be interpreted as having any dependency or requirement relating to any one or combination of components illustrated in the exemplary computing system architecture 500.

Various embodiments may be described in the general context of computer-executable instructions, such as program modules, being executed by a computer. Generally, program modules include any software element arranged to perform particular operations or implement particular abstract data types. Some embodiments may also be practiced in distributed computing environments where operations are performed by one or more remote processing devices that are linked through a communications network. In a distributed computing environment, program modules may be located in both local and remote computer storage media including memory storage devices.

As shown in FIG. 5, the computing system architecture 500 includes a general purpose computing device such as a computer 510. The computer 510 may include various components typically found in a computer or processing system. Some illustrative components of computer 510 may include, but are not limited to, a processing unit 520 and a memory unit 530.

In one embodiment, for example, the computer 510 may include one or more processing units 520. A processing unit 520 may comprise any hardware element or software element arranged to process information or data. Some examples of the processing unit 520 may include, without limitation, a complex instruction set computer (CISC) microprocessor, a reduced instruction set computing (RISC) microprocessor, a very long instruction word (VLIW) microprocessor, a processor implementing a combination of instruction sets, or other processor device. In one embodiment, for example, the processing unit 520 may be implemented as a general purpose processor. Alternatively, the processing unit 520 may be implemented as a dedicated processor, such as a controller, microcontroller, embedded processor, a digital signal processor (DSP), a network processor, a media processor, an input/output (I/O) processor, a media access control (MAC) processor, a radio baseband processor, a field programmable gate array (FPGA), a programmable logic device (PLD), an application specific integrated circuit (ASIC), and so forth. The embodiments are not limited in this context.

In one embodiment, for example, the computer 510 may include one or more memory units 530 coupled to the processing unit 520. A memory unit 530 may be any hardware element arranged to store information or data. Some examples of memory units may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), EEPROM, Compact Disk ROM (CD-ROM), Compact Disk Recordable (CD-R), Compact Disk Rewriteable (CD-RW), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk (e.g., floppy disk, hard drive, optical disk, magnetic disk, magneto-optical disk), or card (e.g., magnetic card, optical card), tape, cassette, or any other medium which can be used to store the desired information and which can accessed by computer 510. The embodiments are not limited in this context.

In one embodiment, for example, the computer 510 may include a system bus 521 that couples various system components including the memory unit 530 to the processing unit 520. A system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, and so forth. The embodiments are not limited in this context.

In various embodiments, the computer 510 may include various types of storage media. Storage media may represent any storage media capable of storing data or information, such as volatile or non-volatile memory, removable or non-removable memory, erasable or non-erasable memory, writeable or re-writeable memory, and so forth. Storage media may include two general types, including computer readable media or communication media. Computer readable media may include storage media adapted for reading and writing to a computing system, such as the computing system architecture 500. Examples of computer readable media for computing system architecture 500 may include, but are not limited to, volatile and/or nonvolatile memory such as ROM 531 and RAM 532. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio-frequency (RF) spectrum, infrared and other wireless media. Combinations of the any of the above could also be included within the scope of computer readable media.

In various embodiments, the memory unit 530 includes computer storage media in the form of volatile and/or non-volatile memory such as ROM 531 and RAM 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536, and program data 537.

The computer 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media discussed above and illustrated in FIG. 5, provide storage of computer readable instructions, data structures, program modules and other data for the computer 510. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies. A user may enter commands and information into the computer 510 through input devices such as a keyboard 562 and pointing device 561, commonly referred to as a mouse, trackball or touch pad. Other input devices (not shown) may include a microphone, joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 584 or other type of display device is also connected to the system bus 521 via an interface, such as a video processing unit or interface 582. In addition to the monitor 584, computers may also include other peripheral output devices such as speakers 587 and printer 586, which may be connected through an output peripheral interface 583.

The computer 510 may operate in a networked environment using logical connections to one or more remote computers, such as a remote computer 580. The remote computer 580 may be a personal computer (PC), a server, a router, a network PC, a peer device or other common network node, and typically includes many or all of the elements described above relative to the computer 510, although only a memory storage device 581 has been illustrated in FIG. 5 for clarity. The logical connections depicted in FIG. 5 include a local area network (LAN) 571 and a wide area network (WAN) 573, but may also include other networks. Such networking environments are commonplace in offices, enterprise-wide computer networks, intranets and the Internet.

When used in a LAN networking environment, the computer 510 is connected to the LAN 571 through an adapter or network interface 570. When used in a WAN networking environment, the computer 510 typically includes a modem 572 or other technique suitable for establishing communications over the WAN 573, such as the Internet. The modem 572, which may be internal or external, may be connected to the system bus 521 via the network interface 570, or other appropriate mechanism. In a networked environment, program modules depicted relative to the computer 510, or portions thereof, may be stored in the remote memory storage device. By way of example, and not limitation, FIG. 5 illustrates remote application programs 585 as residing on memory device 581. It will be appreciated that the network connections shown are exemplary and other techniques for establishing a communications link between the computers may be used. Further, the network connections may be implemented as wired or wireless connections. In the latter case, the computing system architecture 500 may be modified with various elements suitable for wireless communications, such as one or more antennas, transmitters, receivers, transceivers, radios, amplifiers, filters, communications interfaces, and other wireless elements. A wireless communication system communicates information or data over a wireless communication medium, such as one or more portions or bands of RF spectrum, for example. The embodiments are not limited in this context.

Some or all of the communications system 100 and/or computing system architecture 500 may be implemented as a part, component or sub-system of an electronic device. Examples of electronic devices may include, without limitation, a processing system, computer, server, work station, appliance, terminal, personal computer, laptop, ultra-laptop, handheld computer, minicomputer, mainframe computer, distributed computing system, multiprocessor systems, processor-based systems, consumer electronics, programmable consumer electronics, personal digital assistant, television, digital television, set top box, telephone, mobile telephone, cellular telephone, handset, wireless access point, base station, subscriber station, mobile subscriber center, radio network controller, router, hub, gateway, bridge, switch, machine, or combination thereof. The embodiments are not limited in this context.

In some cases, various embodiments may be implemented as an article of manufacture. The article of manufacture may include a storage medium-arranged to store logic and/or data for performing various operations of one or more embodiments. Examples of storage media may include, without limitation, those examples as previously described. In various embodiments, for example, the article of manufacture may comprise a magnetic disk, optical disk, flash memory or firmware containing computer program instructions suitable for execution by a general purpose processor or application specific processor. The embodiments, however, are not limited in this context.

Various embodiments may be implemented using hardware elements, software elements, or a combination of both. Examples of hardware elements may include any of the examples as previously provided for a logic device, and further including microprocessors, circuits, circuit elements (e.g., transistors, resistors, capacitors, inductors, and so forth), integrated circuits, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method, comprising:
   receiving, at an access edge server for a first federated enterprise network, a message sent to a client in the first federated enterprise network from a peer in a second federated enterprise network;
   determining the peer is an untrusted peer;
   comparing by a processor a message rate value with a message rate limit value to generate a threat status indicator value for the untrusted peer, the message rate value determined using a count of a number of messages from the second federated enterprise network, the count including messages from any entity within the second federated enterprise network;
   dynamically adjusting the message rate limit value in accordance with a rate adjustment metric based on message traffic patterns including a number of errors communicated to the first federated enterprise network; and
   authorizing, by the access edge server, communication of the message from the untrusted peer based on the threat status indicator value.

2. The method of claim 1, comprising dynamically adjusting the message rate limit value based on one or more rate adjustment metrics.

3. The method of claim 1, comprising dynamically adjusting the message rate limit value in accordance with a rate adjustment metric based on a federation partner type.

4. The method of claim 1, comprising dynamically adjusting the message rate limit value in accordance with a rate adjustment metric based on administrator configuration parameters.

5. The method of claim 1, comprising dynamically adjusting the message rate limit value in accordance with a rate adjustment metric based on a size for a user group.

6. The method of claim 1, comprising dynamically adjusting the message rate limit value in accordance with a rate adjustment metric based on a message traffic direction.

7. The method of claim 1, comprising dynamically adjusting the message rate limit value in accordance with a rate adjustment metric based on a number of message connections.

8. An article of manufacture comprising a computer-readable storage memory unit containing computer-readable, computer-executable instructions that if executed enable a system to:
   receive, at an access edge server for a first federated enterprise network, a message sent to a client in the first federated enterprise network from an untrusted peer in a second federated enterprise network;
   compare by a processor a message rate value with a message rate limit value associated with the untrusted peer, the message rate value determined using a count of a number of messages from the second federated enterprise network, the count including messages from any entity within the second federated enterprise network;
   dynamically adjust the message rate limit value in accordance with a rate adjustment metric based on message traffic patterns including a number of errors communicated to the first federated enterprise network; and
   authorize, by the access edge server, communication of the message based on the comparison.

9. The article of claim 8, further comprising instructions that if executed enable the system to dynamically adjust the message rate limit value based on one or more rate adjustment metrics.

10. The article of claim 8, further comprising instructions that if executed enable the system to reject the message when a message rate value is equal to or greater than a message rate limit value for the untrusted peer.

11. The article of claim 8, further comprising instructions that if executed enable the system to accept the message when a message rate value is less than a message rate limit value for the untrusted peer.

12. The article of claim 8, wherein the peer is the entire second federated enterprise network.

13. The article of claim 8, further comprising instructions that if executed enable the system to associate a threat watch indicator with the untrusted peer when a message rate value is equal to or greater than a message rate limit value.

14. The article of claim 8, further comprising instructions that if executed enable the system to display an operator message indicating said message has been received from said untrusted peer.

15. An access edge server apparatus, comprising:
   a processor;
   a network interface operative to communicate messages;
   a secure open federation module executing on the processor in a first federated network, communicatively coupled to the network interface, the secure open federation module operative to manage a message rate between multiple federated networks, the secure open federation module comprising:
      a peer authentication module operative to determine whether a peer in a second federated network sending a message to a client in the first federated network is an untrusted peer;
      a peer rate tracking module operative to retrieve a message rate value and a message rate limit value associated with the untrusted peer, and compare by the processor the message rate value with the message rate limit value to form a threat status indicator value, the message rate value determined using a count of a number of messages from the second federated network, the count including messages from any entity within the second federated network and to dynamically adjust the message rate limit value in accordance with a rate adjustment metric based on message traffic patterns including a number of errors communicated to the first federated enterprise network; and
      a peer authorization module operative to authorize communication of the message based on the threat status indicator value.

16. The apparatus of claim 15, the peer rate tracking module operative to dynamically adjust the message rate limit value based on one or more rate adjustment metrics.

17. The apparatus of claim 15, wherein the peer is the entire second federated enterprise network.

18. The apparatus of claim 15, comprising a peer tracking database operative to store the message rate value and the message rate limit value.

19. The apparatus of claim 15, the peer authentication module operative to determine the untrusted peer is a trusted peer based on the threat status indicator value after expiration of a defined time period.

\* \* \* \* \*